No. 768,999. PATENTED AUG. 30, 1904.
C. C. KING.
BRIDLE BIT.
APPLICATION FILED FEB. 8, 1904.
NO MODEL.
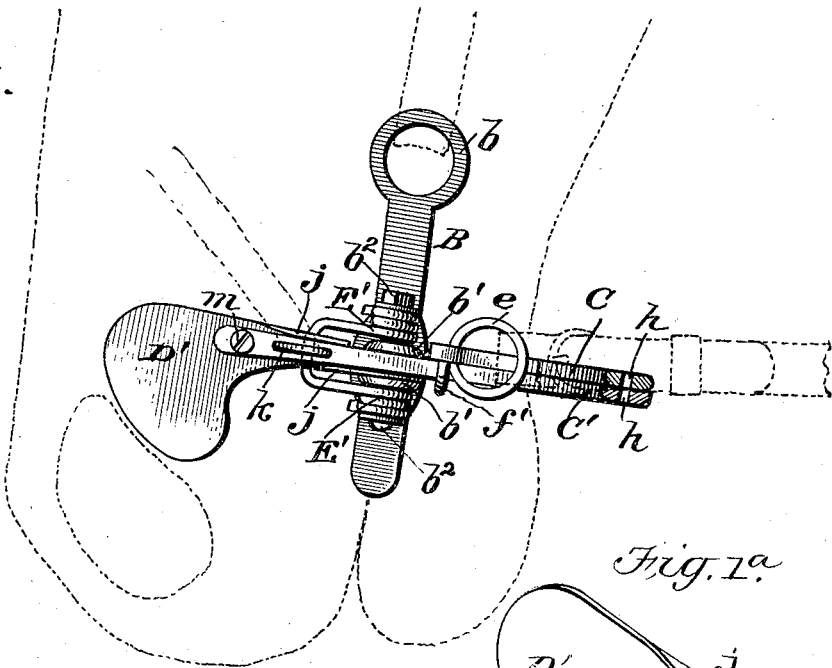
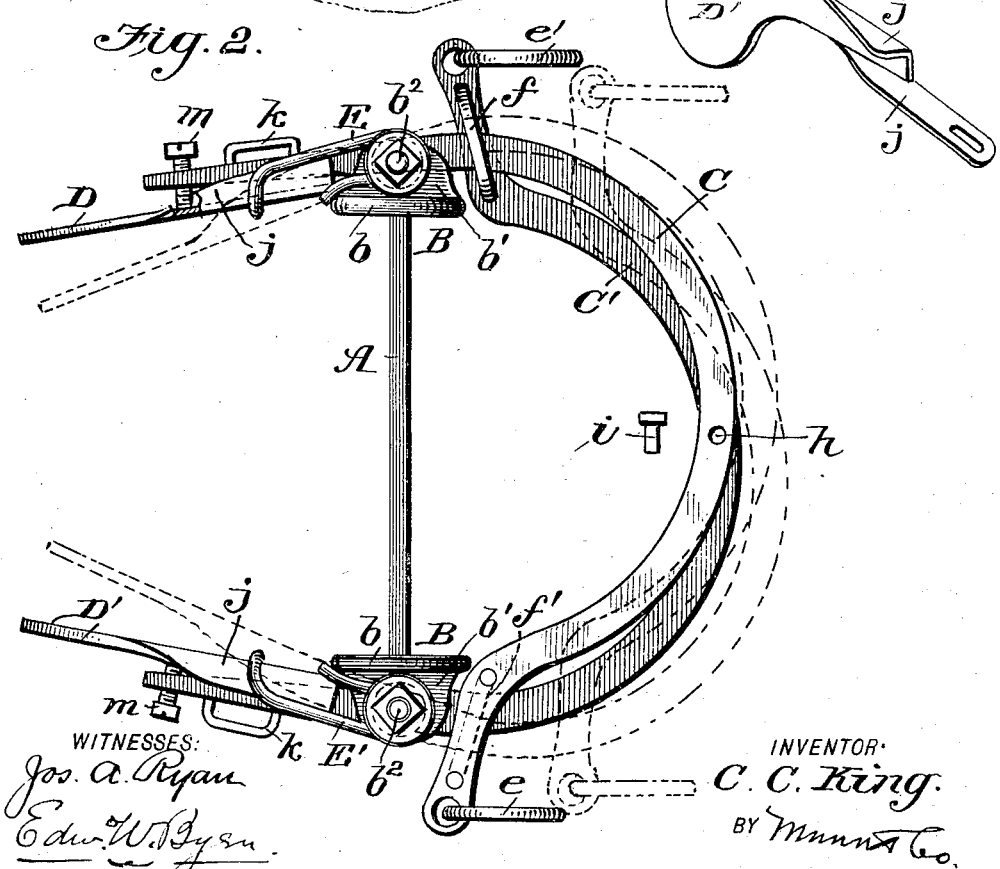
WITNESSES:
Jos. A. Ryan
Edw. W. Byrn
INVENTOR·
C. C. King.
BY Munn & Co.
ATTORNEYS No. 768,999. Patented August 30, 1904.

UNITED STATES PATENT OFFICE.

CHARLES COOPER KING, OF LITTLE ROCK, ARKANSAS.

BRIDLE-BIT.

SPECIFICATION forming part of Letters Patent No. 768,999, dated August 30, 1904.

Application filed February 8, 1904. Serial No. 192,647. (No model.)

*To all whom it may concern:*

Be it known that I, CHARLES COOPER KING, a citizen of the United States, residing at Little Rock, in the county of Pulaski and State of Arkansas, have invented a new and useful Improvement in Bridle-Bits, of which the following is a specification.

My invention is in the nature of a bridle-bit for kicking, balky, or runaway horses; and it consists in the novel construction and arrangement of parts of the bit whereby an extreme tension put upon the reins is made to so adjust the parts of the bit as to pinch and close the nostrils of the horse, and by cutting off his supply of air reduce him to subjection, as hereinafter fully described with reference to the drawings, in which—

Figure 1 is a side view of the bit, the head of the horse to which it is to be applied being shown in dotted lines. Fig. 1$^a$ is a detail, and Fig. 2 is a plan, view of the bit on a larger scale, showing in dotted lines the movement of the parts for closing the horse's nostrils.

In the drawings, A represents the mouth-piece or bit proper, which is rigidly attached to the two sides or cheek-pieces B B, which have at their upper ends loops $b\ b$ for connection with the headstall of the bridle.

C and C' are two curved clamping-levers, which are constructed and arranged exactly alike. These levers are curved to semicular form and extend around the lower jaw of the animal from one side to the other. Each lever is fulcrumed between two lugs $b'\ b'$, formed on the cheek-pieces B B, by means of a fulcrum-bolt $b^2$. The front ends of the levers have presser-plates D D', which are designed to press upon and close the nostrils of the horse by the movement of the levers C C'. Each lever is pivoted upon one side of the bit and then passes rearwardly around the horse's jaw to the opposite side, just in rear of the opposite cheek-piece, and is there provided with a ring into which is buckled the forward end of the rein. The rings $e\ e'$ are normally held to the front and the presser-plates D D' away from the horse's nostrils by loop-springs E E', which have their middle bends hooked around the shanks of the presser-plates and their rear ends coiled around the pivot-bolts $b^2$, one end above and the other below the lugs $b'\ b'$ of the cheek-pieces. When an extreme tension is put upon the reins, the rings $e\ e'$ are drawn to the rear about the pivot-bolts $b^2$, and the presser-plates D D' are pressed together, as shown in dotted lines in Fig. 2, and are made to pinch and close the nostrils of the horse, so as to cut off the supply of air and by stopping the breath of the animal reduces him to subjection. At the rein end of each curved lever there is a keeper or guide loop $f$ and $f'$. This loop on each lever embraces the shank of the other lever, so that the two levers are reciprocally guided upon each other as they move to the rear in response to the tension on the reins.

The springs E E' are made of considerable strength, so that a slight tension of the reins, such as is ordinarily applied for guiding the animal, will not apply the presser-plates; but only a tension above the ordinary will apply the presser-plates. The devices may, however, be locked, so that they cannot apply the presser-plates at all. A simple and practical device for doing this consists of a small pin or bolt $i$ and two coinciding holes $h\ h$, formed in the two levers. This bolt is to be placed in the two coinciding holes in the levers when the latter are in a forward position, and when so placed the levers are locked, so that they cannot be turned about their pivots by any amount of pulling on the reins.

To adapt the bit to horses of different sizes of heads, the presser-plates are made adjustable forward or backward in relation to the cheek-pieces by being made with flanges $j$ at their rear ends, which form channels that receive the forward ends of the levers. Set-screws $m$ pass through the forward ends of the levers and bear against the presser-plates to hold them rigid. To the forward ends of the levers are attached loops or keepers $k$, which receive the ends of the nose-strap. These keepers $k$ coöperate with the nose-strap (shown in dotted lines) and also with the presser-plates D D' in that this connection prevents the horse from opening his mouth and thus throwing his nostrils away from the presser-plate. For securing the adjustable presser-plates the lower flange $j$ of each plate is extended to the rear and is caught between the curved lever and the lower lug $b'$, as seen in Fig. 1, the extended flange being slotted to permit the bolt $b^2$ to pass through and allow the longitudinal adjustment of the presser-plates to fit the noses of different horses. Rigidity is given to the presser-plates on the forward ends of the curved levers by the bend of springs E pressing in one direction and the set-screw $m$ pressing in the other direction.

Having thus described my invention, what I claim as new, and desire to secure by Letters Patent, is—

1. A bridle-bit having cheek-pieces with laterally-projecting lugs, levers arranged between the lugs and curved rearwardly as described, pivot-bolts forming fulcrums for the levers, presser-plates mounted on the front ends of the levers and loop-springs embracing and pressing outwardly the shanks of the presser-plates and having their ends coiled about the pivot-bolts substantially as shown and described.

2. A bridle-bit having cheek-pieces with levers pivoted to the same and presser-plates mounted on the forward ends of the levers to be forced against the horse's nostrils thereby, pivot-bolts connecting the levers to the cheek-pieces, loop-springs embracing and pressing outwardly the shank of the presser-plates and having their ends coiled about the pivot-bolts and set-screws tapped through the forward ends of the levers and bearing against the presser-plates in opposition to the springs substantially as described.

3. A bridle-bit comprising cheek-pieces, curved levers, pivot-bolts connecting the levers to the cheek-pieces, presser-plates mounted on the forward ends of the levers and having flanged shanks one of said flanges being extended past the pivot-bolt and secured by the protrusion of the pivot-bolt therethrough, loop-shaped springs having their ends coiled about the pivot-bolts and their middle portions embracing and pressing outwardly the shanks of the presser-plates, set-screws tapped through the forward ends of the levers and engaging the presser-plates, said presser-plates being made longitudinally adjustable as described.

4. A bridle-bit having curved and pivoted levers bearing presser-plates at their front ends and having also, in front of their pivots, keepers to receive a nose-band substantially as and for the purpose described.

CHARLES COOPER KING.

Witnesses:
W. F. CHICK,
L. L. JACKLETT.